United States Patent
You

(10) Patent No.: US 10,857,048 B2
(45) Date of Patent: Dec. 8, 2020

(54) SMART BRAKE SYSTEM FOR SAFETY AT SLOPE

(71) Applicant: Young Bae You, Yangju-si (KR)

(72) Inventor: Young Bae You, Yangju-si (KR)

(*) Notice: Subject to any disclaimer, the term of this patent is extended or adjusted under 35 U.S.C. 154(b) by 0 days.

(21) Appl. No.: 16/099,439

(22) PCT Filed: Dec. 1, 2016

(86) PCT No.: PCT/KR2016/014055
§ 371 (c)(1),
(2) Date: Nov. 7, 2018

(87) PCT Pub. No.: WO2017/195959
PCT Pub. Date: Nov. 16, 2017

(65) Prior Publication Data
US 2019/0142663 A1    May 16, 2019

(30) Foreign Application Priority Data

May 10, 2016  (KR) .................. 10-2016-0056808
May 19, 2016  (KR) .................. 10-2016-0061196

(51) Int. Cl.
| | |
|---|---|
| A61G 5/10 | (2006.01) |
| B60T 7/12 | (2006.01) |
| B60T 8/24 | (2006.01) |
| A61G 5/04 | (2013.01) |
| F16H 1/10 | (2006.01) |
| B60T 17/06 | (2006.01) |

(52) U.S. Cl.
CPC ............. *A61G 5/1021* (2013.01); *A61G 5/04* (2013.01); *A61G 5/10* (2013.01); *A61G 5/1027* (2013.01);
(Continued)

(58) Field of Classification Search
CPC ... B60T 7/12; B60T 7/122; B60T 8/24; B60T 8/245; A61G 5/10; A61G 5/1005; A61G 5/1021; A61G 5/1086; A61G 5/1027
(Continued)

(56) References Cited

U.S. PATENT DOCUMENTS 2,934,381 A * 4/1960 Hill ........................... B60T 8/26
                                                        303/9.67
3,623,575 A * 11/1971 Joseph .................. B60B 33/021
                                                        188/31

(Continued)

FOREIGN PATENT DOCUMENTS

| EP | 0220734 A2 * | 5/1987 | ........... A61G 5/1035 |
| KR | 10-1994-0014070 A | 7/1994 | |

(Continued)

OTHER PUBLICATIONS

International Search Report for PCT/KR2016/014055 dated Mar. 21, 2017 from Korean Intellectual Property Office.

*Primary Examiner* — Thomas J Williams
(74) *Attorney, Agent, or Firm* — Revolution IP, PLLC

(57) ABSTRACT

A smart brake system for safety at movement on a slope, includes: a multi-brake which comprises a deceleration brake for working while moving on a descending slope and a ratchet brake for working while moving on an ascending slope; a brake controller which selectively controls one of the deceleration brake and the ratchet brake to work as buoyancy of fluid is varied depending on the movement on the descending or the ascending slope.

9 Claims, 14 Drawing Sheets

(52) U.S. Cl.
CPC ............. *B60T 7/12* (2013.01); *B60T 7/122*
(2013.01); *B60T 8/24* (2013.01); *B60T 8/245*
(2013.01); *F16H 1/10* (2013.01); *B60T 17/06*
(2013.01)

(58) Field of Classification Search
USPC ................. 188/9, 10, 20, 19, 2 F, 139, 177
See application file for complete search history.

(56) References Cited

U.S. PATENT DOCUMENTS

| | | | | |
|---|---|---|---|---|
| 5,301,971 | A * | 4/1994 | Brereton | ............. A61G 5/10 280/242.1 |
| 5,845,746 | A * | 12/1998 | Henrickson | ............. A61G 5/10 188/2 F |
| 6,899,212 | B2 * | 5/2005 | Li | ............. F16D 41/088 188/177 |
| 7,124,858 | B2 * | 10/2006 | Ikegami | ............. A61G 5/1027 188/2 F |
| 7,316,298 | B2 * | 1/2008 | Yeager | ............. A61G 5/10 188/17 |

FOREIGN PATENT DOCUMENTS

| | | | |
|---|---|---|---|
| KR | 20-1998-0012513 | U | 6/1998 |
| KR | 10-2002-0052304 | A | 7/2002 |
| KR | 10-2009-0057338 | A | 6/2009 |
| KR | 10-1536708 | B1 | 7/2015 |

\* cited by examiner

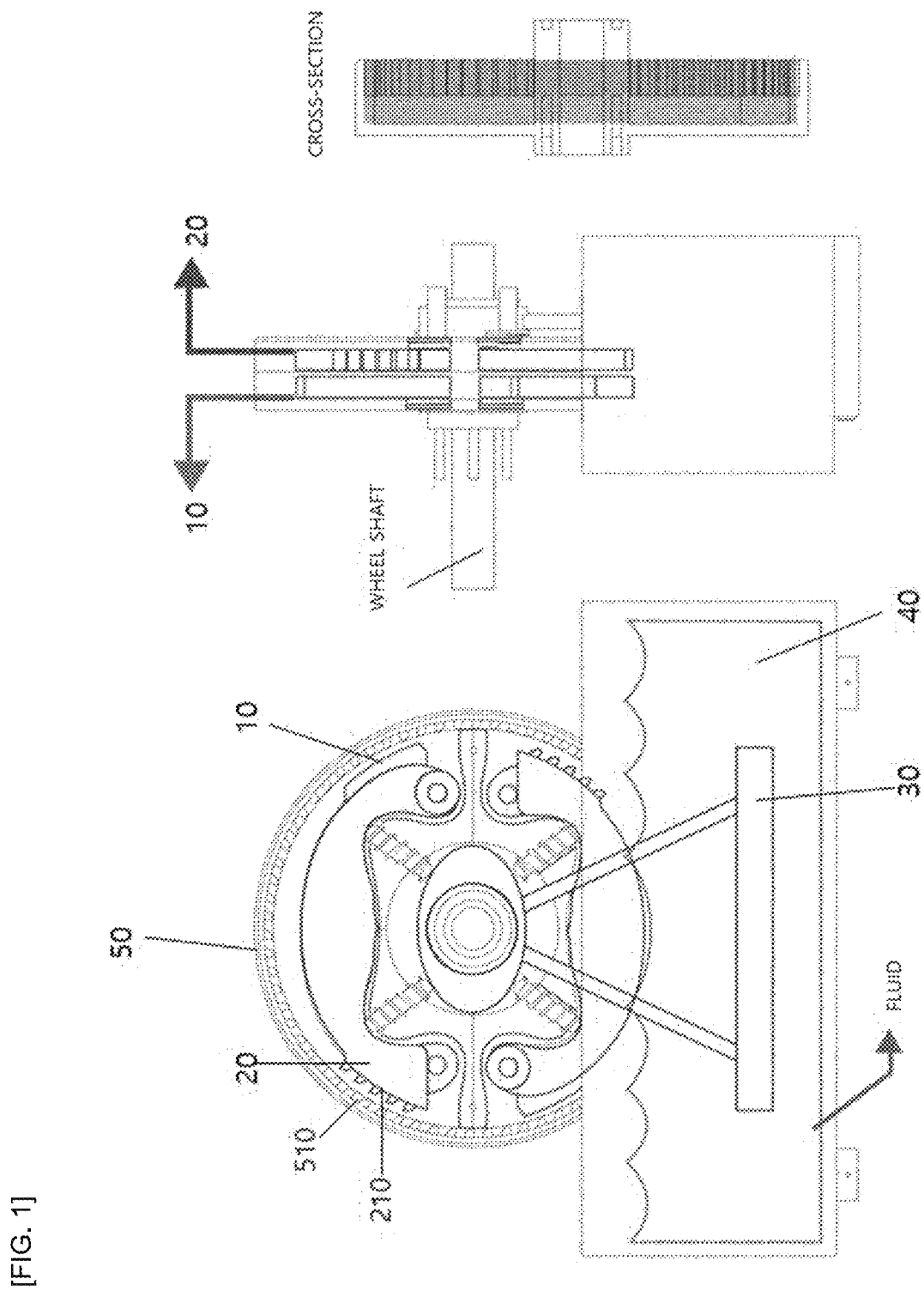

[FIG. 2]
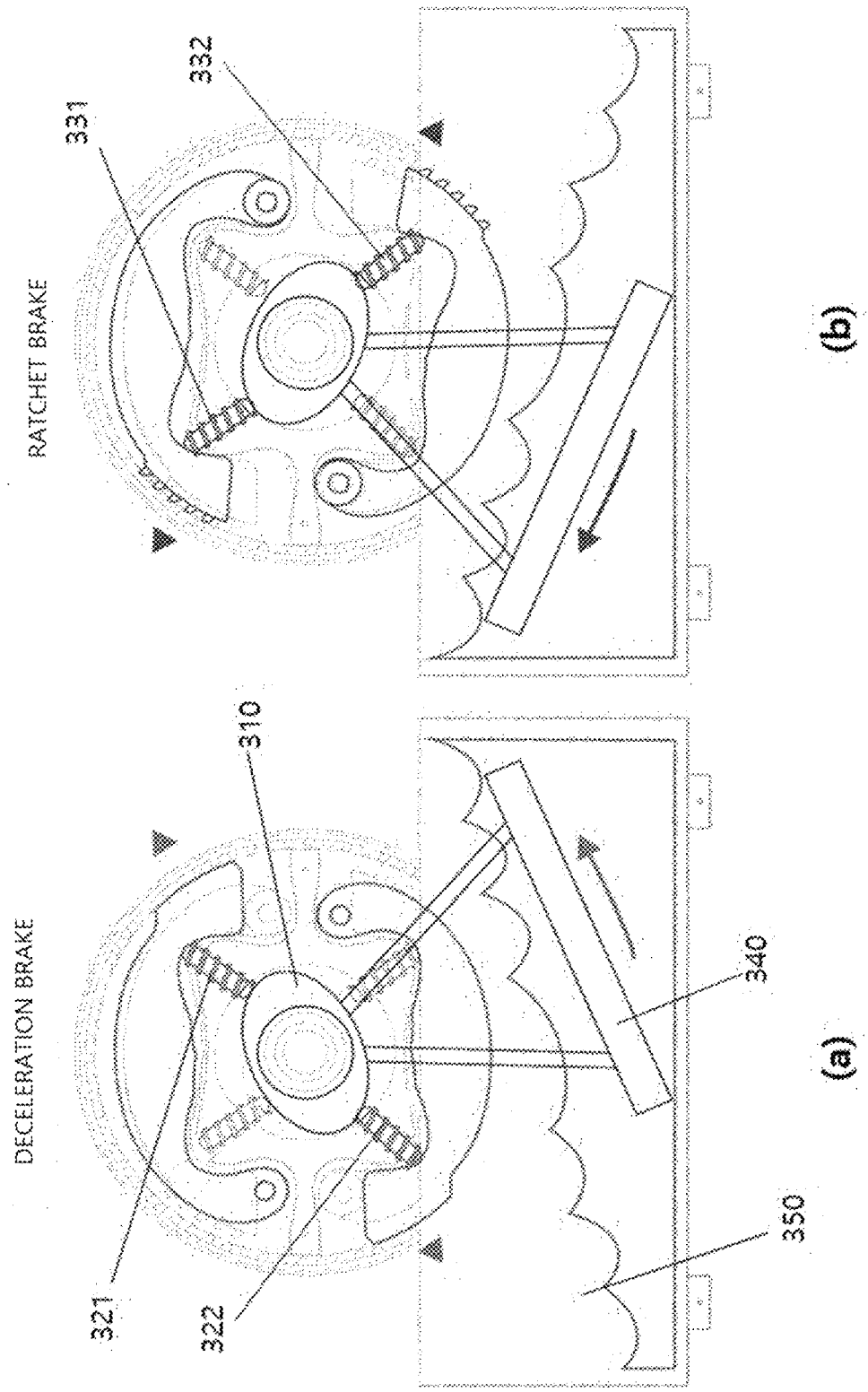

[FIG. 3]
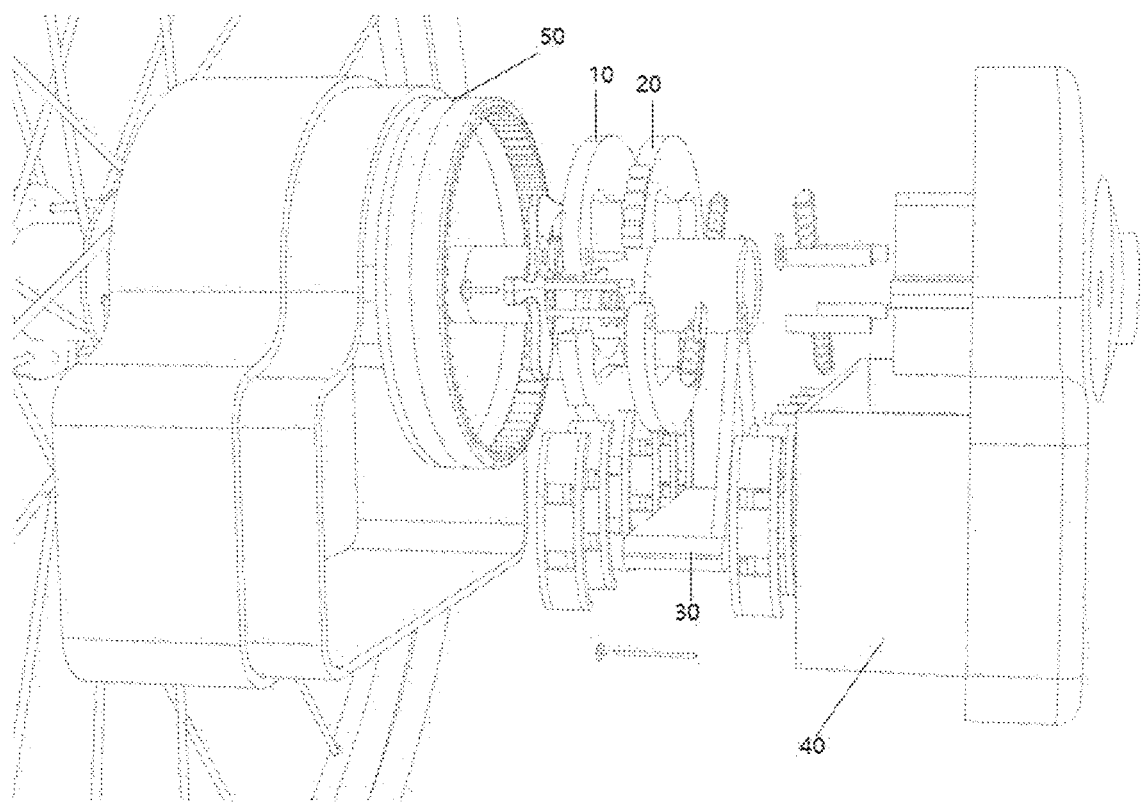

[FIG. 4]
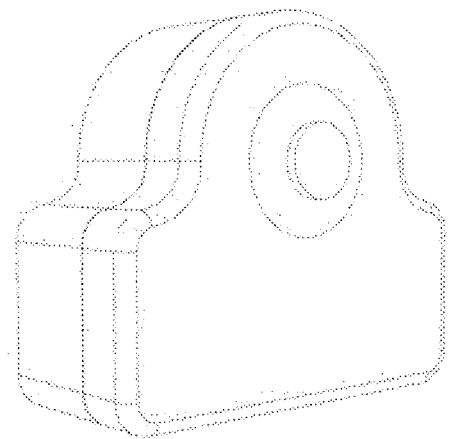
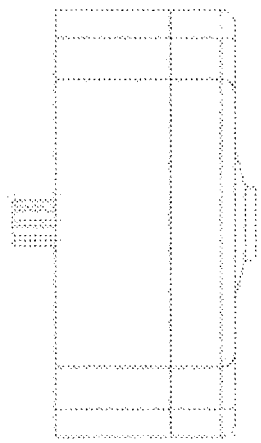
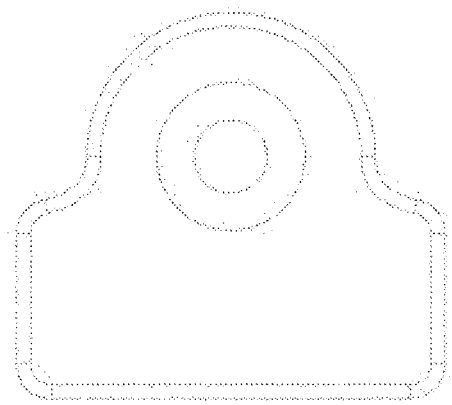
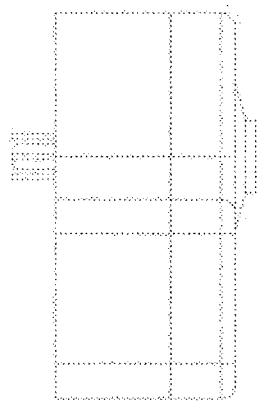

[FIG. 5]
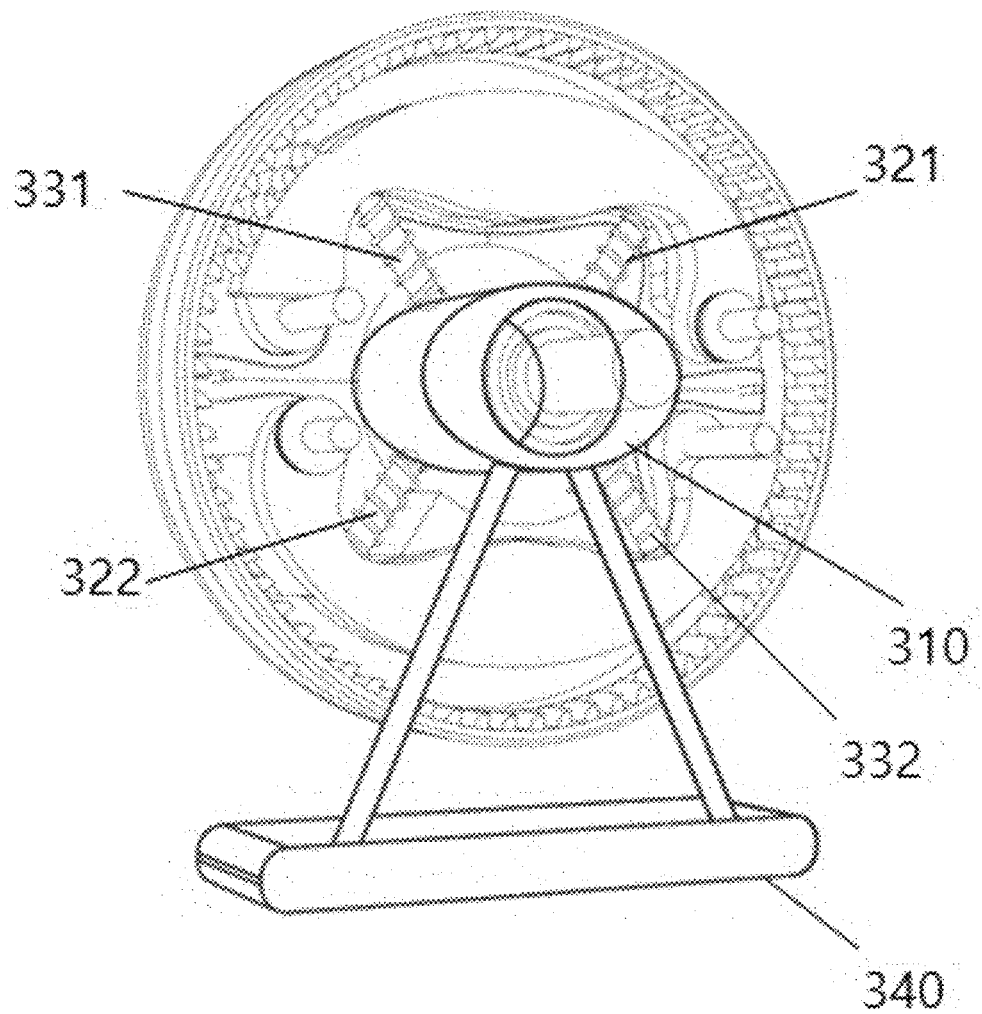

[FIG. 6]
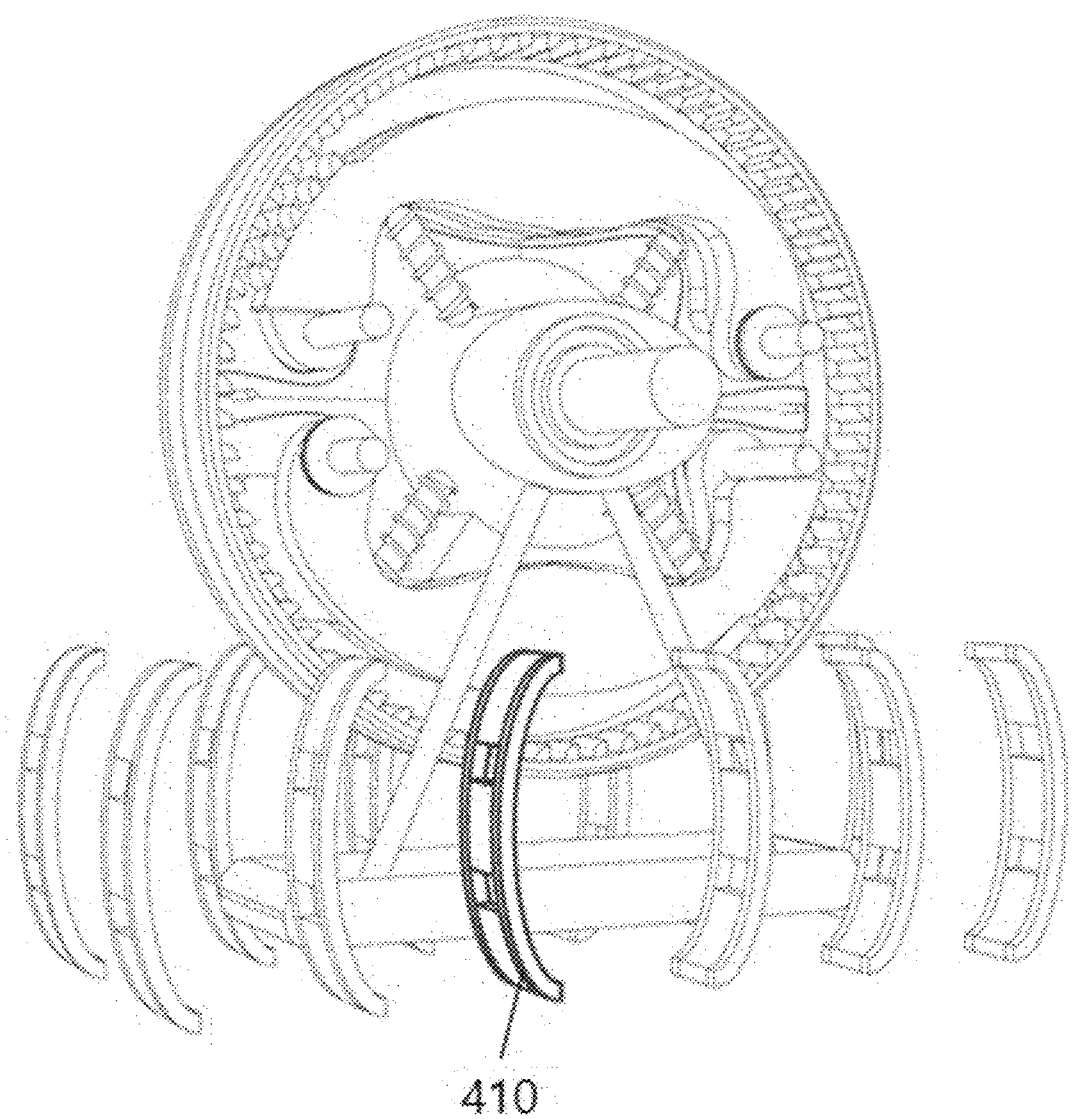

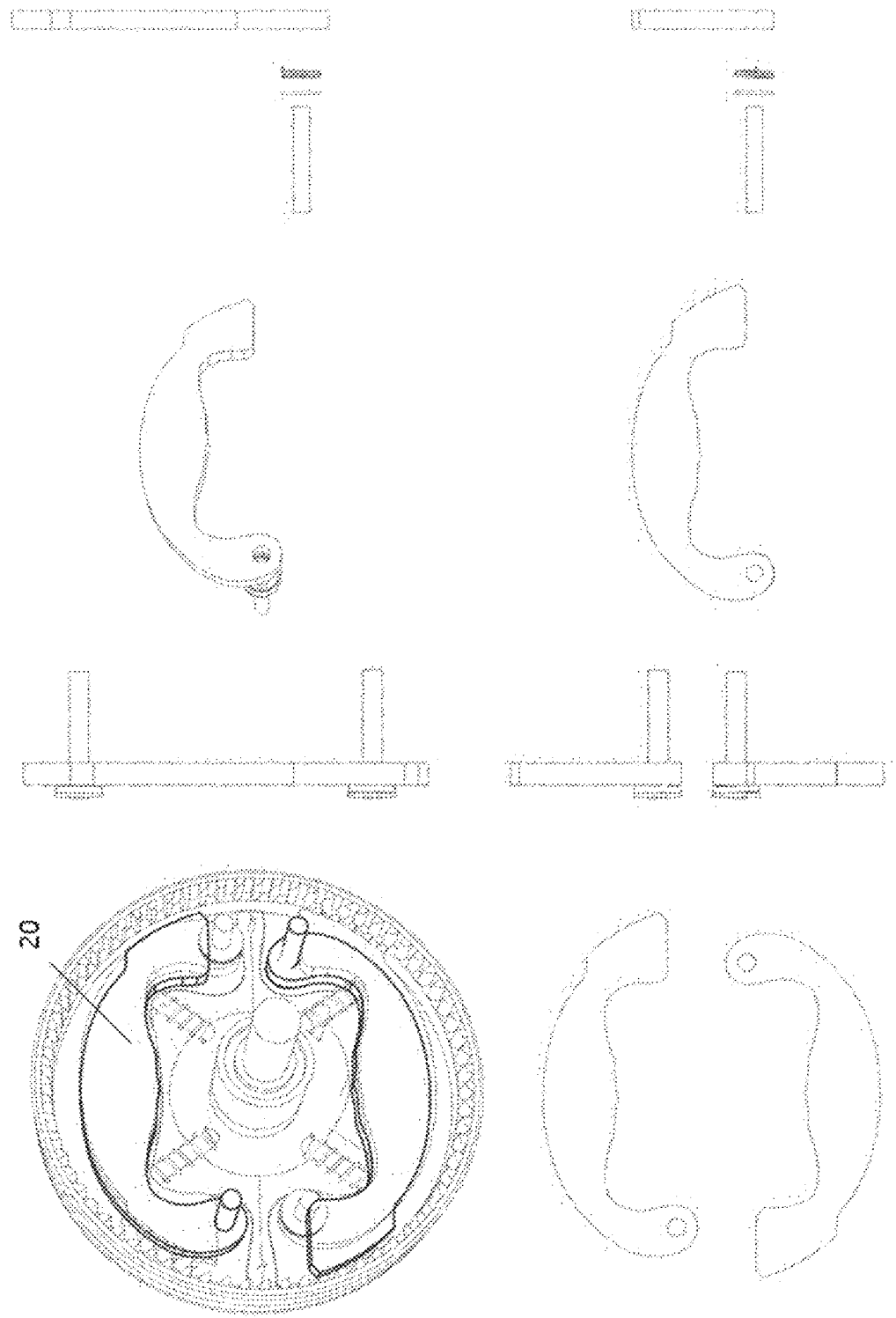
[FIG. 7]

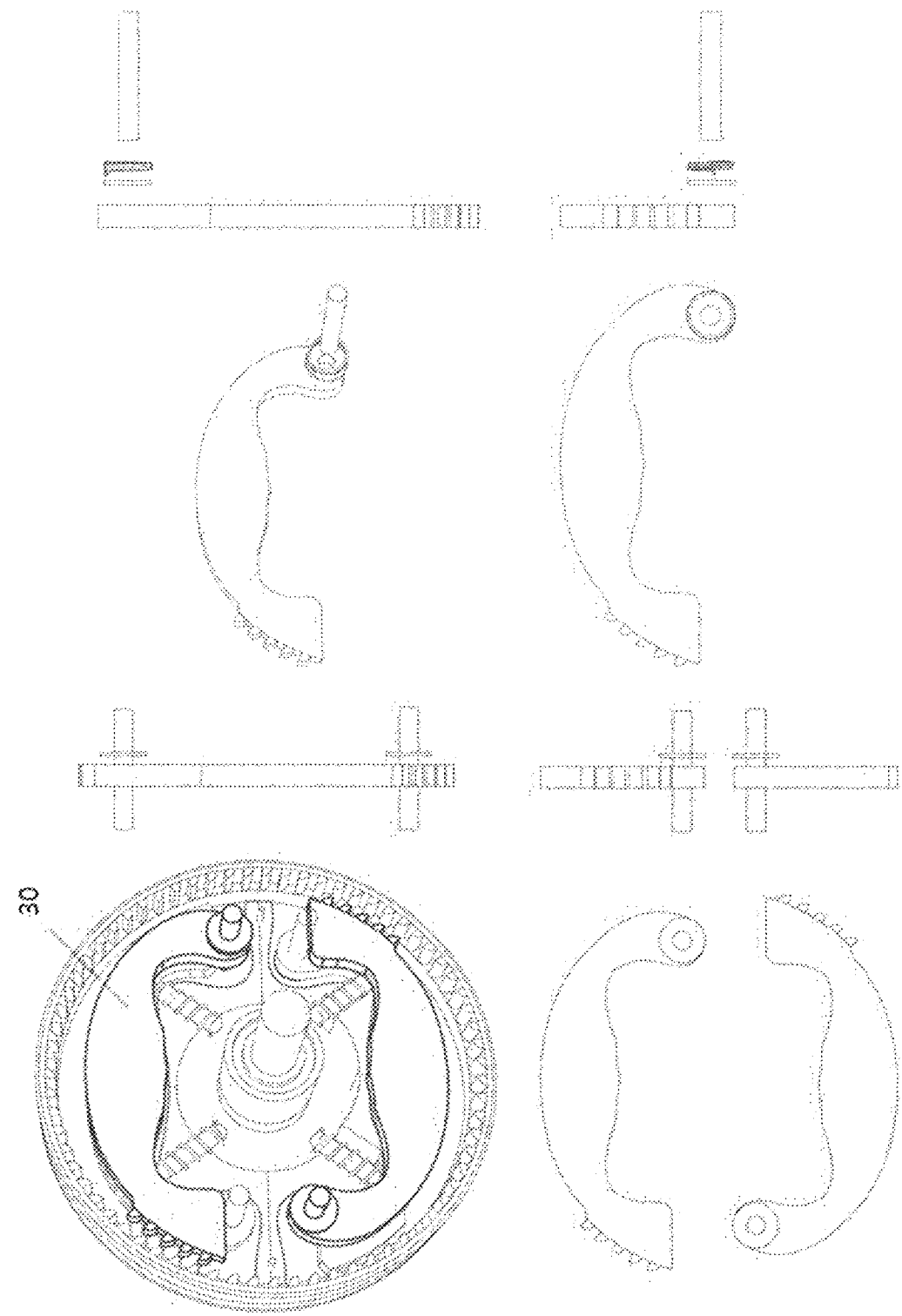
[FIG. 8]

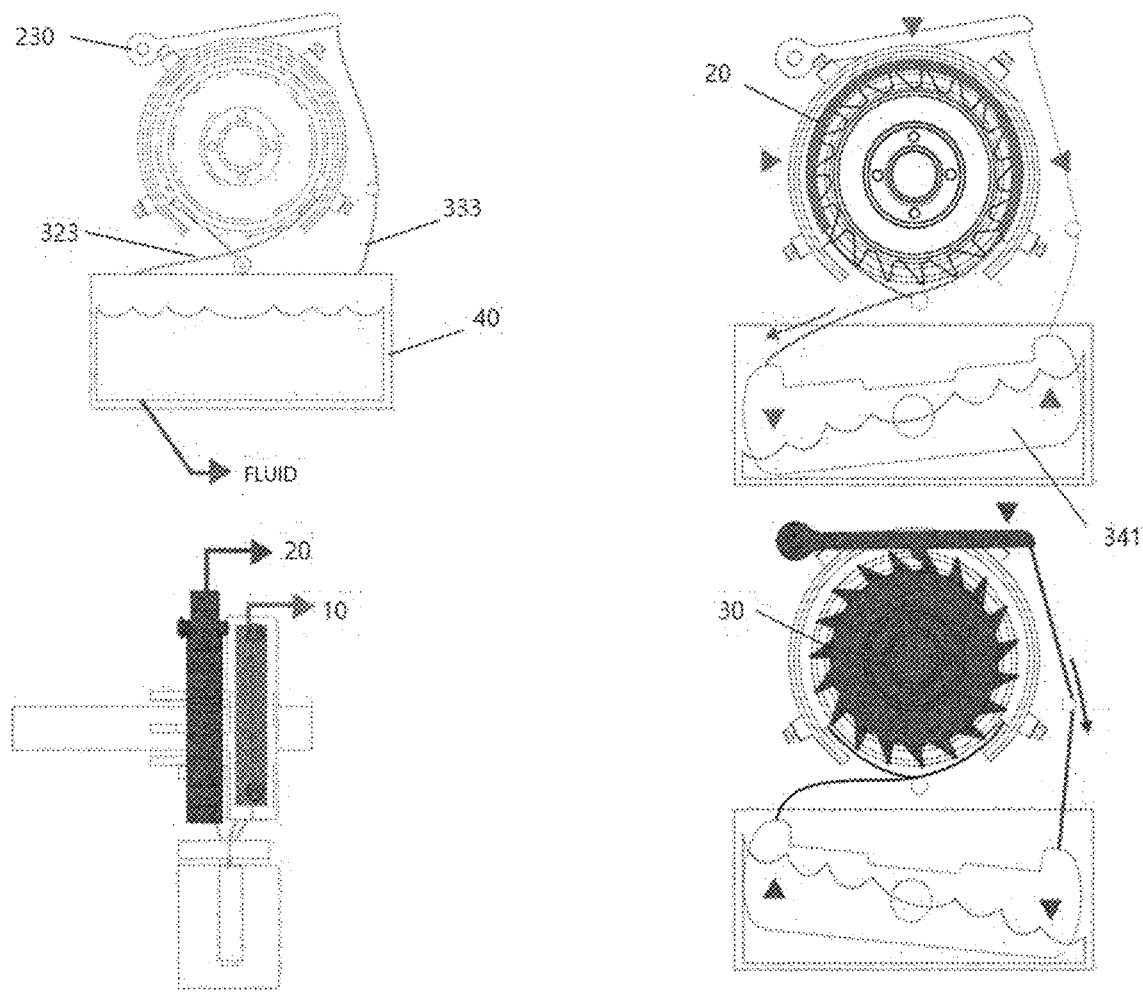
[FIG. 9]

[FIG. 10]
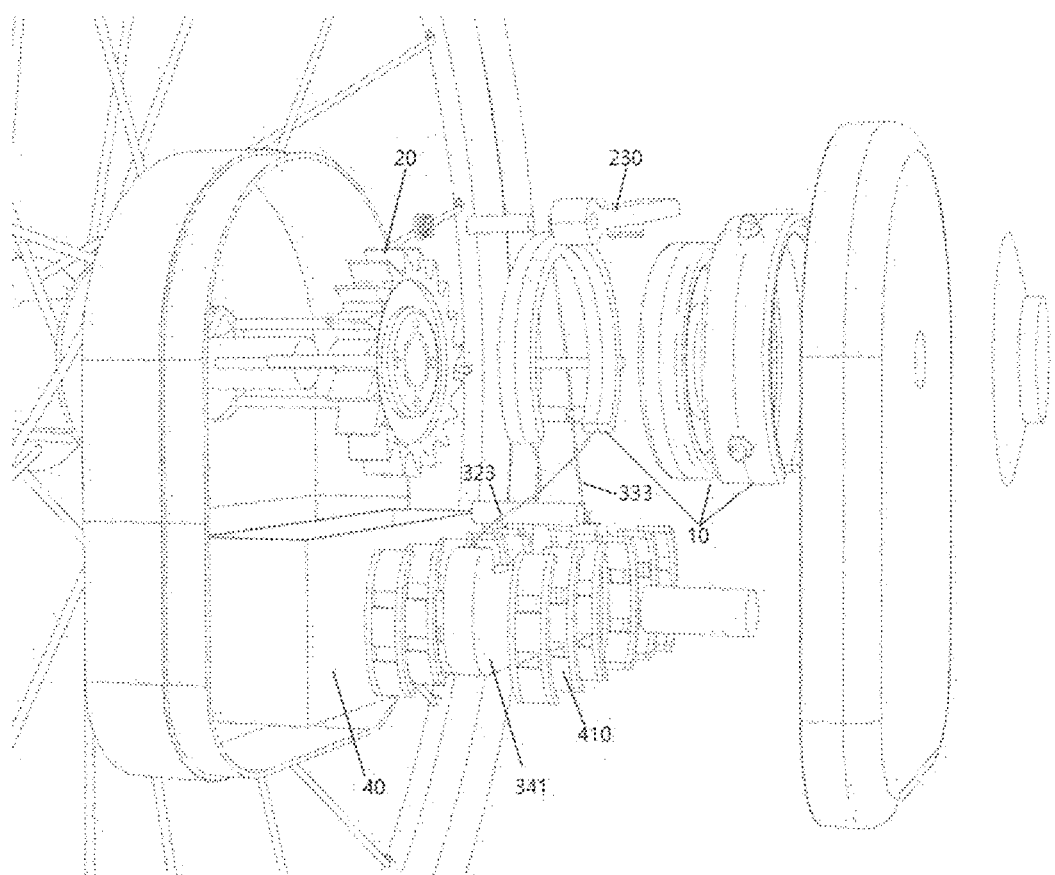

[FIG. 11]
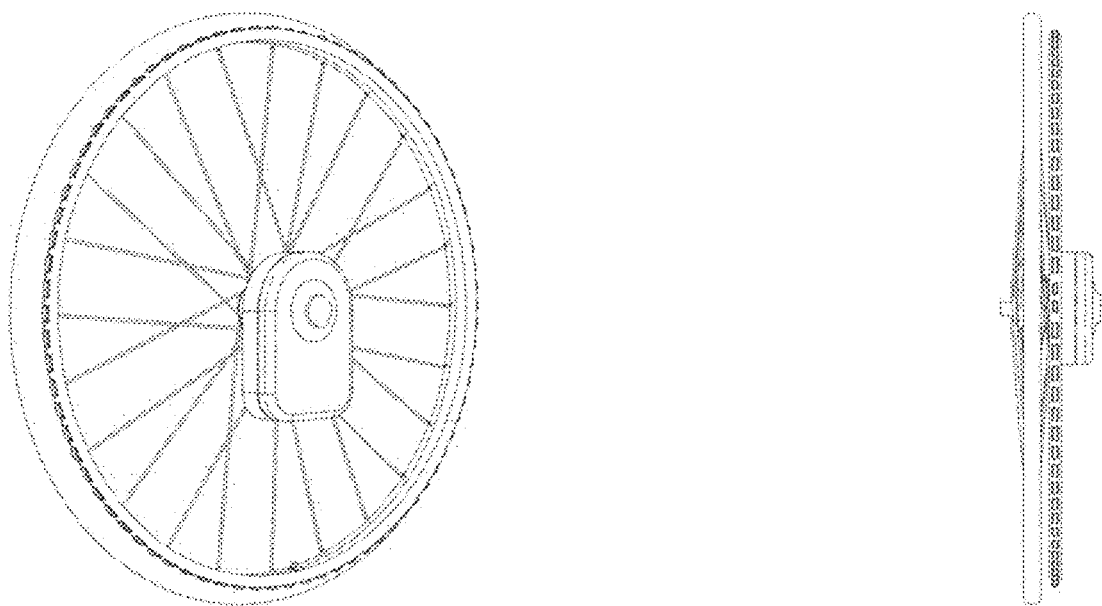
[FIG. 12]
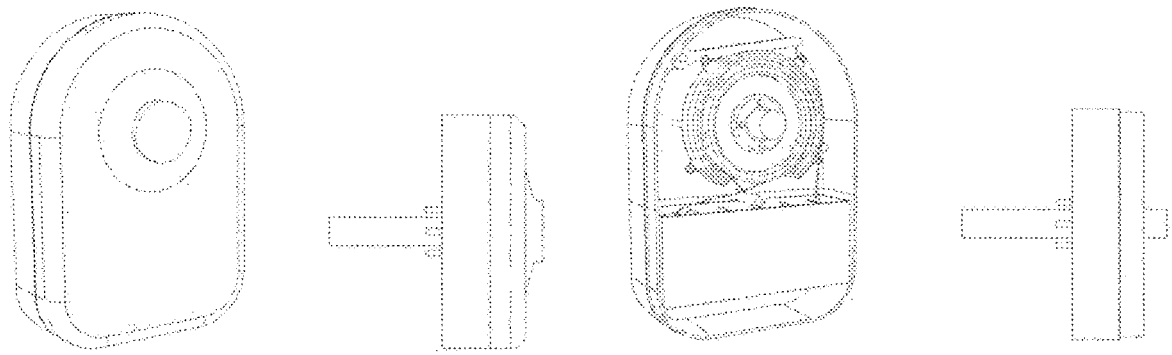

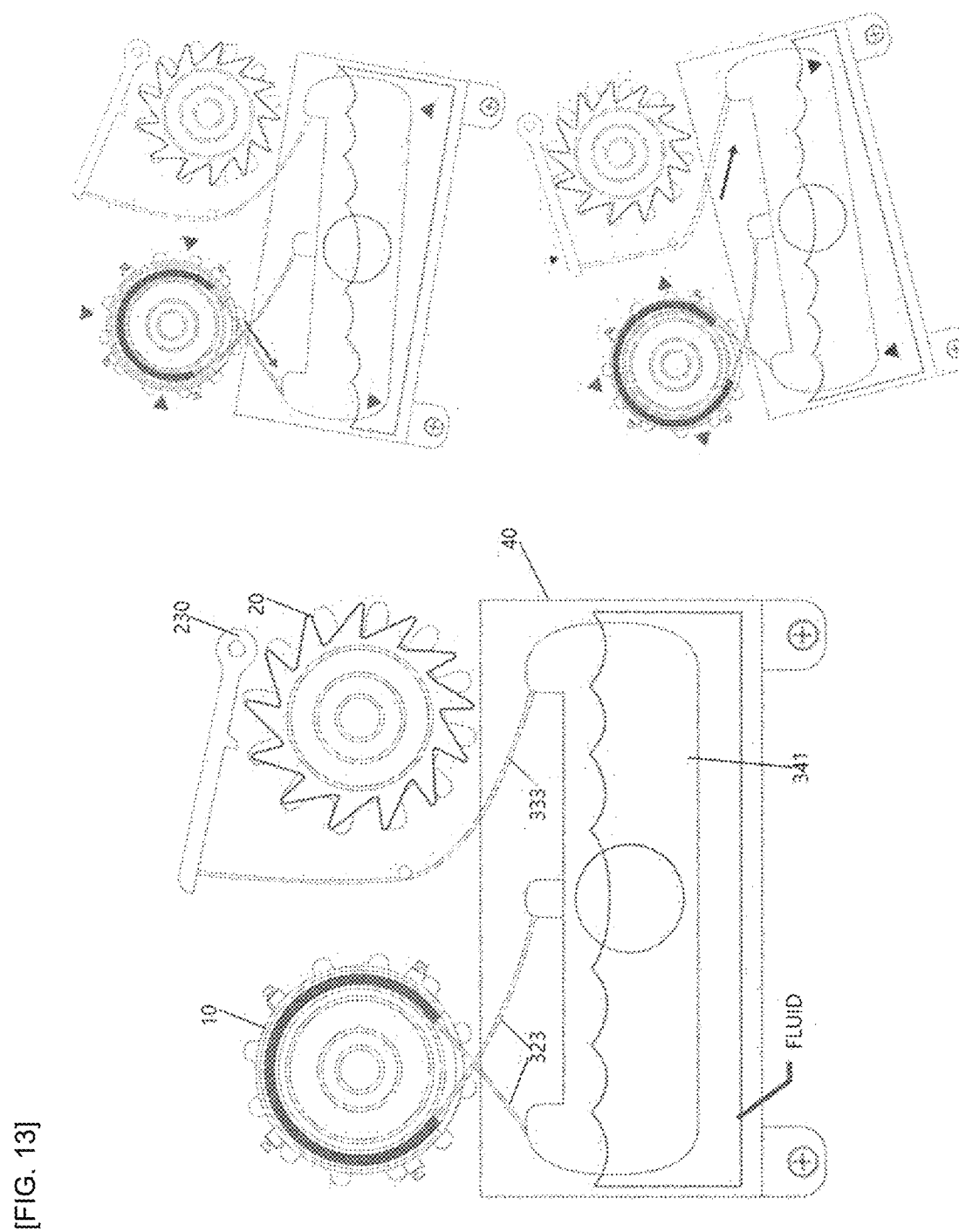
[FIG. 13]

[FIG. 14]
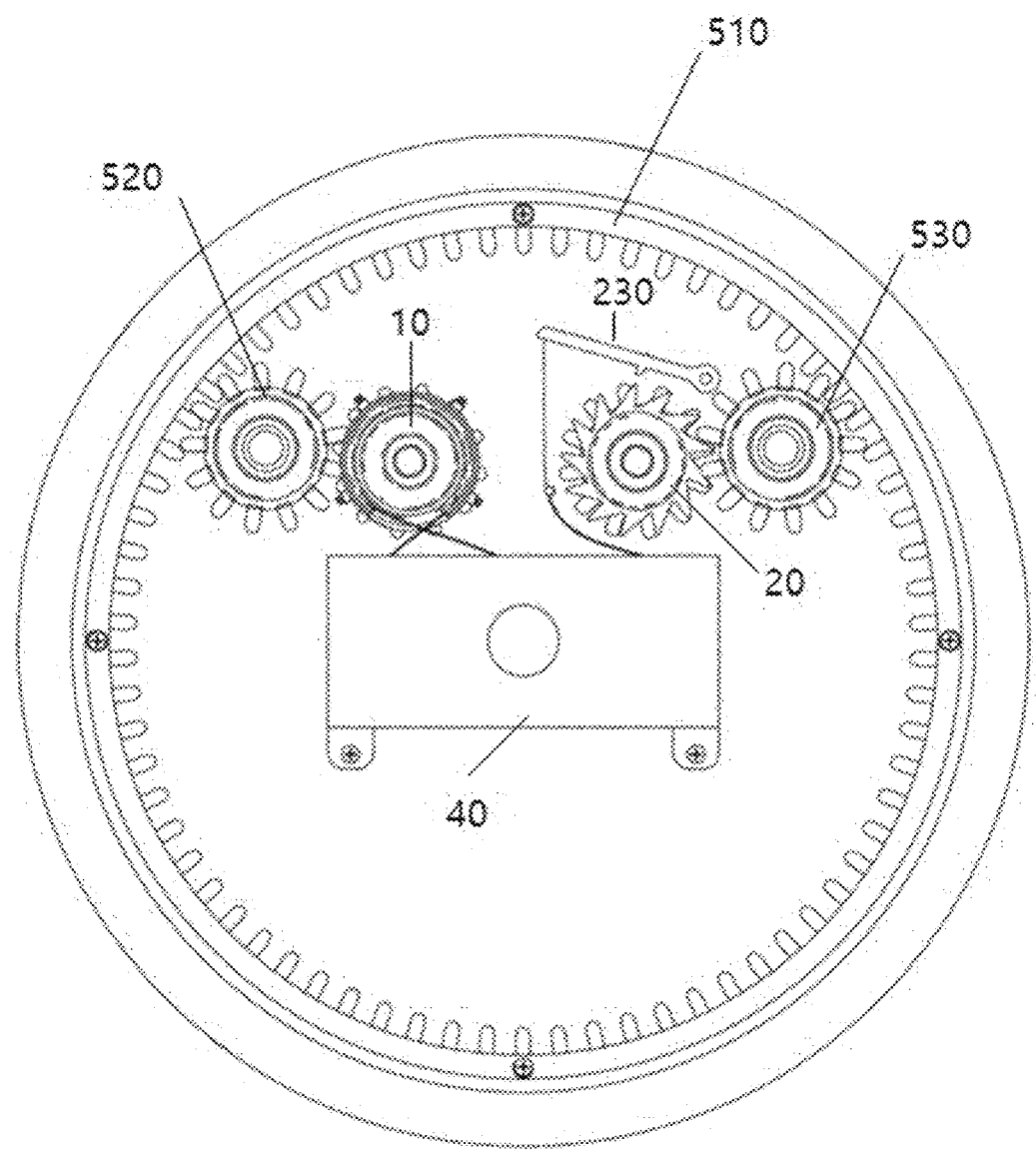

[FIG. 15]
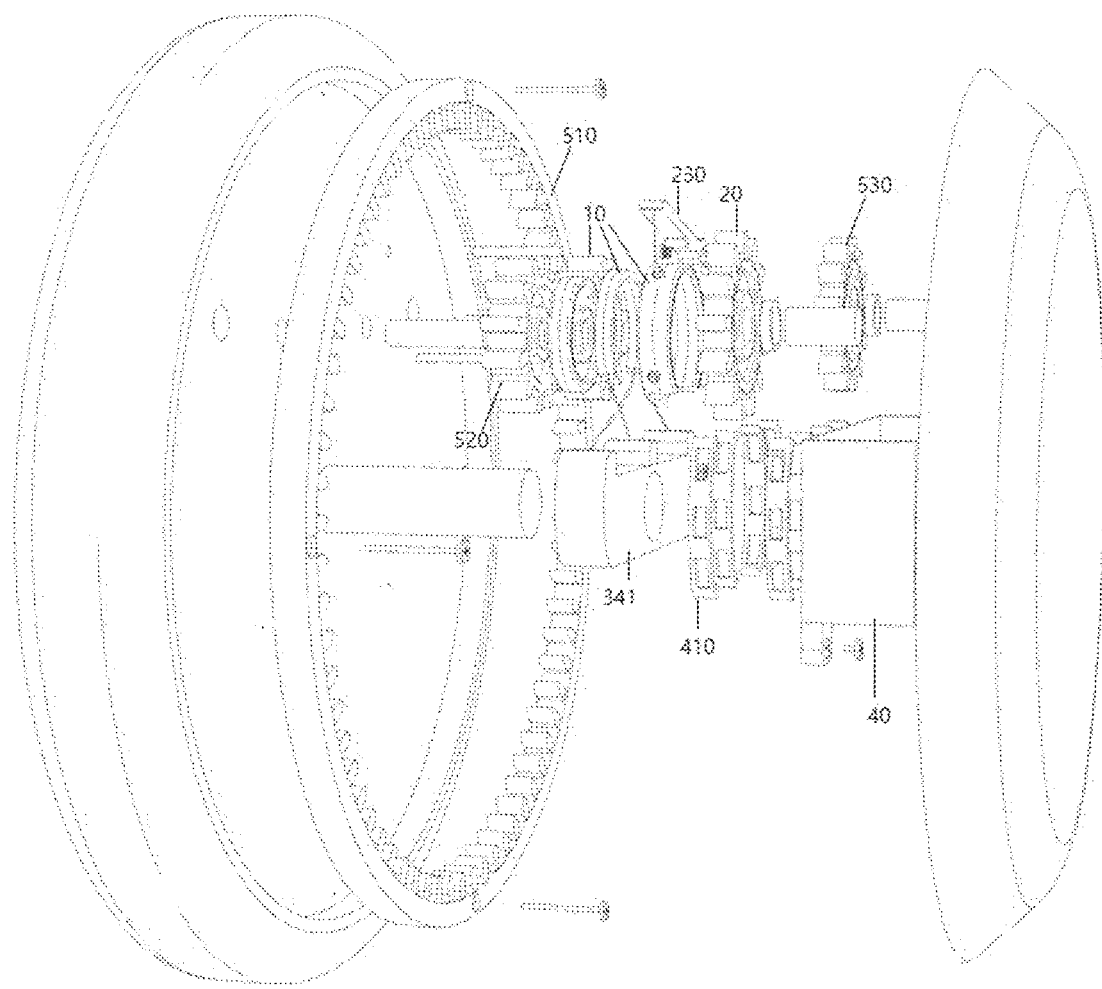

SMART BRAKE SYSTEM FOR SAFETY AT SLOPE

TECHNICAL FIELD

The present invention relates to a smart brake system, and more particularly to a brake automatic control system using gravity and buoyancy, which controls a brake to work in a deceleration mode on a descending slope and in a ratchet mode to prevent backward rolling on an ascending slope, thereby making safe movement even on the slopes.

BACKGROUND ART

In general, a wheelchair, a baby carriage, a walker or the like means for transportation with wheels maintains a speed on a flat land but accelerates on a descending slope or rolls backward on an ascending slope, and therefore accidents frequently occur.

In particular, the wheelchair is the transportation means used for a patient who is indisposed, and therefore accidents are highly likely to occur while the wheelchair is moving on an ascending or descending slope since the patient who sits in the wheelchair is unwell. Therefore, the wheelchair requires special attention while moving on the ascending or descending slope.

No matter how special the attention is paid, accidents frequently occurs since it is very difficult for a patient who is indisposed to control the speed of the wheel chair on the descending or ascending slope.

Specifically, in a case of the descending slope, the wheelchair accelerates and moves so fast that a person sitting thereon may get injured seriously by falling or secondary collision. In a case of the ascending slope, the wheelchair may roll backward while going up the ascending slope, and thus a person sitting therein may get injured seriously by falling or secondary collision.

Further, the baby carriage is moving as pushed by a guardian from behind, and has risks of accidents while moving on the slopes like the wheelchair.

Likewise, the bicycle for a toddler or child also has risks of accidents on the descending or ascending slope. In general, the means for transportation with the wheel has risks of accidents while moving on the slopes.

DISCLOSURE

Technical Problem

Accordingly, the present invention is conceived to solve the foregoing problems, and an aspect of the present invention is to provide a smart brake system for safety at movement on a slope, in which the brake automatically works based on gravity and buoyancy to prevent accidents while moving on the slope as buoyancy is kept corresponding to change in gravity on a flat land, an ascending slope or a descending slope.

Technical Solution

In accordance with an embodiment of the present invention, there is provided a smart brake system for safety at movement on a slope, including: a multi-brake which includes a deceleration brake for working while moving on a descending slope and a ratchet brake for working while moving on an ascending slope; and a brake controller which selectively controls one of the deceleration brake and the ratchet brake to work as buoyancy of fluid is varied depending on the movement on the descending or the ascending slope.

The multi-brake includes the deceleration brake configured to decelerate while moving on a descending slope; the ratchet brake formed to be coaxially adjacent to the deceleration brake and preventing backward rolling by ratchet locking while moving on the ascending slope; and a brake drum configured to accommodate both the deceleration brake and the ratchet brake, the brake drum including a ratchet brake accommodating portion formed with a ratchet groove corresponding to a ratchet of the ratchet brake.

Advantageous Effects

As described above, a smart brake control system according to the present invention has a noticeable effect on preventing accidents while moving on a slope such as an ascending or descending slope since one of two different brakes selectively work corresponding to change in gravity on the ascending slope or the descending slope.

DESCRIPTION OF DRAWINGS

FIG. 1 schematically illustrates a brake control system provided in a wheel shaft according to an exemplary embodiment of the present invention, and FIG. 2 illustrates that the brake control system of FIG. 1 works on a descending slope and an ascending slope.

FIG. 3 is an exploded perspective view of the brake control system of FIG. 1, and FIG. 4 illustrates a frame in which the brake control system of FIG. 1 is installed.

FIG. 5 illustrates details of a brake controller of FIG. 1.

FIG. 6 illustrates water blocking plates provided in a fluid tank.

FIG. 7 illustrates details of a deceleration brake of FIG. 1.

FIG. 8 illustrates details of a ratchet brake of FIG. 1.

FIG. 9 schematically illustrates a brake control system according to another exemplary embodiment, and FIG. 10 is an exploded perspective view of the brake control system of FIG. 9 with operations on a descending slope and an ascending slope.

FIGS. 11 and 12 illustrate that the brake control system of FIG. 9 is mounted.

FIG. 13 schematically illustrates a brake control system according to still another embodiment, and FIGS. 14 and 15 illustrate that the brake control system of FIG. 13 works on a descending slope and an ascending slope.

BEST MODE

A smart brake system according to the present invention may include a first brake working on a descending slope, a second brake working on an ascending slope, and a brake controller selectively controlling one of the operations of the first and second brakes in accordance with change in gravity.

In other words, the smart brake system may include a multi-brake, which includes a deceleration brake configured to work on the descending slope, a ratchet brake configured to work on the ascending slope, and the brake controller controlling the deceleration or ratchet brake to work as buoyancy changes in a fluid corresponding to the descending or the ascending slope.

MODES OF THE INVENTION

Below, embodiments of the present invention will be described in detail with reference to accompanying drawings.

A smart brake system according to the present invention may be applied to a wheelchair, a baby carriage, a walker, a cart, a handcart, a handcar, a rear car, a bicycle, and the like means for transportation with a wheel, in particular any human-powered vehicles.

FIG. 1 schematically illustrates a brake control system provided in a wheel shaft according to an exemplary embodiment of the present invention, and FIG. 2 illustrates that the brake control system of FIG. 1 works on a descending slope and an ascending slope.

Referring to FIGS. 1 and 2, the smart brake system according to the present invention may include a first brake working on a descending slope, a second brake working on an ascending slope, and a brake controller selectively controlling one of the operations of the first and second brakes in accordance with change in gravity.

In other words, the smart brake system may include a multi-brake, which includes a deceleration brake 10 configured to work on the descending slope, a ratchet brake 20 configured to work on the ascending slope, and the brake controller 30 controlling the operation of the deceleration or ratchet brake as gravity or buoyancy changes in a fluid corresponding to the descending or the ascending slope.

The multi-brake includes the deceleration brake 10 and the ratchet brake 20, which are coaxially arranged in parallel with each other, and a brake drum 50 in which both the deceleration brake 10 and the ratchet brake 20 are accommodated. In the brake drum 50, a portion for accommodating the ratchet brake 20 is formed with a ratchet groove corresponding to a ratchet of the ratchet brake 20. The ratchet and the ratchet groove may be formed to have directionality for support only unidirectional movement. When the ratchet is locked to the ratchet groove, only forward movement is allowed and backward rolling is prevented.

Therefore, when the deceleration brake works, the deceleration brake is in contact with the inner surface of the drum, thereby decreasing speed. On the other hand, when the ratchet brake works, the ratchet is contact with the ratchet groove formed inside the drum and thus the movement is stopped without the backward rolling, thereby maintaining a current position allowing the forward movement.

That is, movement on a descending slope is controlled by the deceleration brake in a deceleration mode, and movement on an ascending slope is controlled by the ratchet brake in a ratchet mode. On the other hand, no brakes work at movement in a flat land.

Further, the deceleration brake 10 and the ratchet brake 20 may form a pair to face each other.

The brake controller 30 may include a fluid tank filled with fluid; a rotary shaft 310 rotatably coupled to a wheel shaft; a pair of first springs 321 and 322 respectively connected to the rotary shaft 310 and the pair of deceleration brakes 10; and a pair of second springs 331 and 332 respectively connected to the rotary shaft 310 and the pair of ratchet brakes 20; and a pendulum weight 340 coupled to the rotary shaft 310, soaked in the fluid of the fluid tank, and swing left and right according to changes in the gravity of the fluid.

The rotary shaft 310 has an elliptical shape, and one pair of first springs 321 and 322 and one pair of second springs 331 and 332 are coupled to the rotary shaft 310 and approximately perpendicular to each other. As the rotary shaft 310 rotates, only one brake of the multi-brakes selectively receives force and works in such a manner that force is transmitted to only the pair of first springs 321 and 322 when the pendulum weight 340 moves forward and force is transmitted to only the pair of second springs 331 and 332 when the pendulum weight 340 moves backward.

Here, the pendulum weigh 340 is arranged to float in the fluid of the fluid tank by buoyancy. When the wheel is moving on the flat land, the pendulum weight 340 is always positioned in the middle and thus no brakes work.

On the other hand, when the wheel is moving on the descending or ascending slope, the gravity acts in a direction toward low slope, the fluid leans to one side, and the pendulum weight 340 moves in the direction of the gravity to keep the buoyancy, thereby operating the brake.

The fluid tank refers to a tank in which the fluid is filled and stored, and serves to control the operations of the multi-brakes by moving the fluid and swing the pendulum weight 340 to keep the buoyancy as the gravity changes corresponding to the movement on the slope.

Here, the fluid may include any liquid like water, and may be materialized by blending two or more kinds of liquid.

Further, the fluid tank may be filled with ¼-⅓ full of water so as to buoyancy change.

The fluid tank is not integrally fixed and installed to the wheel but configured to rotate by the shaft. On the slope, the fluid tank rotates in the direction of the gravity, and thus the fluid tank is maintained as it is without changing a position (or angle) even in a case of movement on the slope.

In other words, the position (or angle) of the fluid tank is maintained regardless of the movement on the slope, but the movement on the slope makes the fluid filled therein lean toward a direction where the gravity is low, thereby rotating the pendulum weight toward the direction of the low gravity to maintain the buoyancy.

Further, the deceleration brake 10 works while moving on the descending slope, and is provided as a pad for contacting the brake drum 50 and decreasing the speed of the wheel.

The ratchet brake 20 works while moving the ascending slope, and serves to put on the brake and prevent the backward rolling as the ratchet formed in the ratchet brake 20 is locked to the ratchet groove formed in the brake drum 50 when the movement is stopped.

In more detail, as shown in (a) of FIG. 2, in a case of the movement on the descending slope, the descending slope makes the center of gravity moves forward and thus causes the fluid injected into the fluid tank to lean forward. Therefore, the pendulum weight 340 moves and swings forward as much as predetermined displacement to keep the buoyancy as the fluid moves.

Therefore, rotational force is applied to the rotary shaft 310 connected to the pendulum weight 340, and the elasticity is applied to the first springs 321 and 322 connected to the rotary shaft 310 so that the deceleration brake 10 works to come into contact with the brake drum, thereby decreasing the speed.

Here, unlike the brake of the bicycle, the speed does not become zero but decreases as the deceleration brake is in contact with the brake drum. In this manner, the deceleration speed may be previously set by controlling the contact area and force between the deceleration brake and the brake drum.

Further, as shown in (b) of FIG. 2 in a case of the movement on the ascending slope, the ascending slope causes the fluid filled in the fluid tank to lean to the opposite direction, i.e. backward. Therefore, the pendulum weight 340 also moves in the opposite direction, i.e. backward and makes the gravity change in the opposite direction to keep the buoyancy.

Therefore, rotational force is applied to the rotary shaft 310 connected to the pendulum weight 340 in the opposite direction, and the elasticity is applied to the second springs 331 and 322 connected to the rotary shaft 310 so that the ratchet brake 20 works to thereby lock the ratchet of the ratchet brake 20 to the ratchet groove formed in the brake drum. The ratchet and the ratchet groove are formed to allow only the unidirectional movement, and thus the wheel is movable forward but immovable backward.

Accordingly, the wheel is prevented from backward rolling and allowed to move in the ascending direction since the ratchet is locked to the ratchet groove even when the wheel stops moving on the ascending slope, thereby guaranteeing the safety.

Further, according to the present invention, a water blocking plate 410 may be formed as shown in FIG. 6 to prevent the pendulum weight inside the fluid tank from moving in a direction of the shaft or moving left and right even on the flat land. There may be a plurality of water blocking plates 410.

FIG. 9 schematically illustrates a brake control system according to another exemplary embodiment, with operations on a descending slope and an ascending slope, and FIG. 10 is an exploded perspective view of the brake control system of FIG. 9. FIGS. 11 and 12 illustrate that the brake control system of FIG. 9 is mounted.

The embodiment of FIGS. 9 and 10 are different in the configuration of the brake controller using the gravity, and the configurations of the deceleration and ratchet brakes coupled to the brake controller from, but have the same operations and effects as those of FIGS. 1 and 2.

Thus, only different configurations from those of FIGS. 1 and 2 will be described.

In this embodiment, there are no elements corresponding to the brake drum, and thus the deceleration brake and the ratchet brake work in itself to have the deceleration or ratchet function.

To this end, the deceleration brake 10 may be configured to make the brake on or off according to tension of a cable, and the ratchet brake 20 may include a ratchet on the brake and a ratchet bar 230 to be caught by the ratchet according to change in tension of the cable.

Further, the brake controller includes a rotary body 341 to keep the buoyancy according to fluid in the fluid tank 40, and the rotary body 341 has first end coupling with a deceleration brake cable 323 and a second end coupling with a ratchet brake cable 333.

Further, the fluid tank 40 is not fixed but movable corresponding to change in gravity, and thus the fluid tank 40 is always maintained as it is without changing a position even in a case of movement on the slope. Therefore, the position of the fluid tank is maintained while moving the ascending or descending slope, but only the fluid filled therein leans to one side as the gravity changes.

Here, when the rotary body 341 is in the flat land, the fluid keeps a balance and thus the brake does not work. While moving on the descending slope, the position of the fluid tank is not changed but only the fluid in the fluid tank leans by gravity to have a low level at one side and a high level at the other side, so that one end of the rotary body 341 is lowered to keep buoyancy, thereby causing tension for pulling the deceleration brake cable 323 and making the deceleration brake 10 work as the brake cable becomes tight.

On the other hand, while moving on the ascending slope, the position of the fluid tank is not changed but only the fluid in the fluid tank leans by gravity to have a high level at one side and a low level at the other side, so that the other end of the rotary body is lowered to keep buoyancy, thereby causing tension for pulling the ratchet brake cable 333 and making the ratchet brake 20 work as the ratchet bar 230 is caught by the ratchet of the ratchet brake 20.

FIG. 13 schematically illustrates a brake control system according to still another embodiment with operations on a descending slope and an ascending slope, and FIGS. 14 and 15 illustrate that the brake control system.

The embodiment shown in FIGS. 13 to 15 is different just in arrangement of the deceleration brake and the ratchet brake from but has the same operations and effects as that shown in FIGS. 9 to 12.

Therefore, only differences from the embodiment of FIGS. 9 to 12 will be described.

The embodiment of FIGS. 9 to 12 shows that the deceleration brake and the ratchet brake are coaxially adjacent to each other, but this embodiment shows that the deceleration brake and the ratchet brake are arranged in parallel on different axes.

Further, the fluid tank 40 in this embodiment is fixedly installed and thus changed in a position (angle) according to the change of the terrain due to the slope movement (having the same structure as the embodiment shown in FIGS. 1 to 2) unlike that of the embodiment shown in FIGS. 9 to 12.

Further, the deceleration brake and the ratchet brake in this embodiment are configured to be engaged with the gear of the wheel via gears.

The wheel includes a wheel gear 510 formed with a gear thread, and the deceleration brake 10 and the ratchet brake 20 are coupled to the gears to be engaged with the wheel gear.

In more detail, the deceleration brake 10 is externally formed with a gear thread to be coupled to a first gear 520 to be engaged with the wheel gear 510, and the ratchet brake 20 is externally formed with a gear thread to be coupled to a second gear 530 to be engaged with the wheel gear 510.

Although a few exemplary embodiments of the present invention have been described with reference to the accompanying drawings, it will be appreciated by those skilled in the art that various changes or modifications may be made in these embodiments without departing from the principles and spirit of the invention, the scope of which is defined in the appended claims and their equivalents.

INDUSTRIAL APPLICABILITY

A smart brake control system according to the present invention is very useful to brake industry for means for transportation with wheels because one between two different brakes is selectively operated by change in the gravity to thereby have a noticeable effect on preventing accidents while moving on a slope such as an ascending slope or a descending slope.

The invention claimed is:
1. A smart brake system for safety at movement on a slope, comprising:
   a multi-brake which comprises a deceleration brake for working while moving on a descending slope and a ratchet brake for working while moving on an ascending slope;
   a brake controller which selectively controls one of the deceleration brake and the ratchet brake to work as buoyancy of fluid is varied depending on the movement on the descending or the ascending slope, wherein the multi-brake comprises:
the deceleration brake configured to brake on or off according to tension of a brake cable; and
the ratchet brake comprising a ratchet formed on the ratchet brake and a ratchet bar to be caught by the ratchet according to change in tension of the cable,
wherein the deceleration brake and the ratchet brake are coaxially arranged in parallel.

2. The smart brake system according to claim 1, wherein the brake controller comprises:
a fluid tank which is not integrally fixed and installed to a wheel but configured to rotate with respect to a shaft, and rotates in a direction of gravity on a slope, so that a position (or angle) of the fluid tank is always maintained without change corresponding to the direction of the gravity even in a case of movement on the slope; and
a rotary body which rotates to keep buoyancy according to change of the fluid in the fluid tank,
wherein the rotary body has a first end coupling with a deceleration brake cable, and a second end coupling with a ratchet brake cable.

3. The smart brake system according to claim 2, wherein,
the brake does not work since the fluid keeps a balance and thus when the rotary body is on a horizontal surface,
the deceleration brake works since the brake cable becomes tight by tension generated to pull the deceleration brake cable as the position of the fluid tank is not changed but only the fluid in the fluid tank leans by gravity to have a low level at one side and a high level at the other side so that one end of the rotary body is lowered to keep buoyancy while moving on the descending slope, and
the ratchet brake works since the ratchet bar is caught by the ratchet of the ratchet brake by tension generated to pull the ratchet brake cable as the position of the fluid tank is not changed but only the fluid in the fluid tank leans by gravity to have a high level at one side and a low level at the other side so that the other end of the rotary body is lowered to keep buoyancy while moving on the ascending slope.

4. A smart brake system for safety at movement on a slope, comprising:
a multi-brake which comprises a deceleration brake for working while moving on a descending slope and a ratchet brake for working while moving on an ascending slope;
a brake controller which selectively controls one of the deceleration brake and the ratchet brake to work as buoyancy of fluid is varied depending on the movement on the descending or the ascending slope,
wherein the multi-brake comprises:
the deceleration brake configured to decelerate while moving on the descending slope;
the ratchet brake formed to be coaxially adjacent to the deceleration brake and preventing backward rolling by ratchet locking while moving on the ascending slope; and
a brake drum configured to accommodate both the deceleration brake and the ratchet brake, the brake drum comprising a ratchet brake accommodating portion formed with a ratchet groove corresponding to a ratchet of the ratchet brake, and
wherein the brake controller comprises:
a fluid tank filled with fluid;
a rotary shaft rotatably coupled to a wheel shaft;
a pair of first springs connected to the rotary shaft and one pair of deceleration brakes, respectively;
a pair of second springs connected to the rotary shaft and one pair of ratchet brakes, respectively; and
a rotary weight coupled to the rotary shaft, soaked in the fluid of the fluid tank, and move leftward and rightward to keep buoyancy as the fluid is varied in gravity.

5. The smart brake system according to claim 4, wherein
the pair of first springs and the pair of second springs coupled to the rotary shaft and approximately perpendicular to each other, and
only one kind of brake of the multi-brake receives force and works as the rotary shaft rotates in such a manner that the deceleration brake works as force is transmitted to only the pair of first springs when a pendulum weight moves forward corresponding to descending movement, and the ratchet brake works as force is transmitted to only the pair of second springs when the pendulum weight moves backward corresponding to ascending movement.

6. The smart brake system according to claim 4, wherein the fluid tank is fixedly installed and has a structure of being changed in a position (angle) according to the change of the terrain due to the slope movement.

7. A smart brake system for safety at movement on a slope, comprising:
a multi-brake which comprises a deceleration brake for working while moving on a descending slope and a ratchet brake for working while moving on an ascending slope;
a brake controller which selectively controls one of the deceleration brake and the ratchet brake to work as buoyancy of fluid is varied depending on the movement on the descending or the ascending slope,
wherein the multi-brake comprises:
the deceleration brake formed with a gear thread; and
the ratchet brake formed with a gear thread;
wherein the deceleration brake and the ratchet brake are arranged in parallel on different axes.

8. The smart brake system according to claim 7, wherein the brake controller comprises:
a fluid tank;
a rotary body which rotates to keep buoyancy according to change of the fluid in the fluid tank, wherein the rotary body has a first end coupling with a deceleration brake cable, and a second end coupling with a ratchet brake cable;
a wheel gear formed with a gear thread on a wheel;
a first gear formed between the deceleration brake and the wheel gear; and
a second gear formed between the ratchet brake and the wheel gear.

9. The smart brake system according to claim 8, wherein the fluid tank is fixedly installed and has a structure of being changed in a position (angle) according to the change of the terrain due to the slope movement.

* * * * *